(12) United States Patent
Lee

(10) Patent No.: US 10,160,323 B2
(45) Date of Patent: Dec. 25, 2018

(54) VEHICLE INSTRUMENT PANEL HAVING THREE-DIMENSIONAL ILLUMINATION EFFECT

(71) Applicants: HYUNDAI MOTOR COMPANY, Seoul (KR); KIA MOTORS CORPORATION, Seoul (KR)

(72) Inventor: Jin Young Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 119 days.

(21) Appl. No.: 15/136,491

(22) Filed: Apr. 22, 2016

(65) Prior Publication Data

US 2017/0166119 A1 Jun. 15, 2017

(30) Foreign Application Priority Data

Dec. 9, 2015 (KR) .................. 10-2015-0174953

(51) Int. Cl.
*G01D 11/28* (2006.01)
*B60K 37/04* (2006.01)
(Continued)

(52) U.S. Cl.
CPC .............. *B60K 37/04* (2013.01); *B60K 37/02* (2013.01); *B60Q 3/14* (2017.02); *F21V 7/0033* (2013.01);
(Continued)

(58) Field of Classification Search
CPC ...... B60K 2350/2017; B60K 2350/203; B60K 37/02; B60K 37/04; B60Q 3/044;
(Continued)

(56) References Cited

U.S. PATENT DOCUMENTS 2,831,453 A * 4/1958 Hardesty ................ G01D 11/28
116/288
4,323,951 A * 4/1982 Pasco ..................... G12B 11/02
362/23.01

(Continued)

FOREIGN PATENT DOCUMENTS

JP 2002-012056 A 1/2002
JP 2003-214914 A 7/2003
(Continued)

OTHER PUBLICATIONS

Korean Office Action dated Jan. 20, 2017, issued in Korean Application No. 10-2015-0174953.
(Continued)

*Primary Examiner* — Tsion Tumebo
(74) *Attorney, Agent, or Firm* — McDermott Will & Emery LLP

(57) ABSTRACT

A vehicle instrument panel having a three-dimensional illumination effect includes a transparent ring having a three-dimensional circular shape, at least one primary scale formed in a front surface of the transparent ring, the at least one primary scale being spaced apart from an adjacent primary scale by a predetermined distance, a reflecting plate for changing a direction of travel of LED light along the transparent ring, generated below the transparent ring, in clockwise and counterclockwise directions, and a prism unit including at least one prism for reflecting a portion of the LED light traveling along the transparent ring toward the at least one primary scale at a predetermined angle.

16 Claims, 4 Drawing Sheets
(2 of 4 Drawing Sheet(s) Filed in Color)

(51) Int. Cl.
*B60Q 3/14* (2017.01)
*F21V 7/00* (2006.01)
*F21V 13/08* (2006.01)
*G02B 5/04* (2006.01)
*F21V 8/00* (2006.01)
*B60K 37/02* (2006.01)
*F21W 106/00* (2018.01)
*F21Y 101/00* (2016.01)

(52) U.S. Cl.
CPC ............ *F21V 7/0066* (2013.01); *F21V 13/08* (2013.01); *G02B 5/04* (2013.01); *G02B 6/0073* (2013.01); B60K 2350/203 (2013.01); B60K 2350/2017 (2013.01); F21W 2106/00 (2018.01); F21Y 2101/00 (2013.01)

(58) Field of Classification Search
CPC ...... F21V 13/08; F21V 7/0033; F21V 7/0066; F21W 2101/08; F21Y 2101/02; G02B 5/04; G02B 6/0073
USPC ....................................................... 362/23.12
See application file for complete search history.

(56) References Cited

U.S. PATENT DOCUMENTS

| | | | | |
|---|---|---|---|---|
| 4,975,807 A * | 12/1990 | Ohashi | ................ | B60K 37/02 362/23.01 |
| 5,703,612 A * | 12/1997 | Salmon | ................ | B60K 37/02 116/286 |
| 5,741,058 A * | 4/1998 | Suzuki | ................ | B60K 35/00 362/23.01 |
| 6,070,549 A * | 6/2000 | Iuchi | ................ | G01D 11/28 116/287 |
| 7,216,997 B2 * | 5/2007 | Anderson, Jr. | ........ | B60K 35/00 362/23.01 |
| 7,357,096 B2 * | 4/2008 | Tane | ................ | G01D 11/28 116/288 |
| 7,374,323 B1 * | 5/2008 | Kelman | ................ | G01D 11/28 116/286 |
| 7,874,689 B2 * | 1/2011 | Tane | ................ | B60K 35/00 362/23.01 |
| 8,814,375 B2 * | 8/2014 | Makita | ................ | G01D 13/28 362/23.01 |
| 8,826,846 B2 * | 9/2014 | Hori | ................ | G01D 11/28 116/286 |
| 9,664,541 B2 * | 5/2017 | Otani | ................ | G01D 11/28 |
| 2006/0185576 A1 * | 8/2006 | Tane | ................ | G01D 11/28 116/288 |
| 2006/0209525 A1 * | 9/2006 | Birman | ................ | B60K 37/02 362/23.11 |
| 2007/0290959 A1 * | 12/2007 | Kim | ................ | B60K 37/02 345/82 |
| 2011/0051393 A1 * | 3/2011 | Ishikawa | ................ | G01D 11/28 362/23.19 |
| 2012/0006253 A1 | 1/2012 | Demma | | |
| 2013/0027902 A1 * | 1/2013 | Miyazawa | ............. | G01D 11/28 362/23.14 |
| 2013/0114240 A1 * | 5/2013 | Makita | ................ | G01D 13/28 362/23.19 |
| 2013/0314891 A1 * | 11/2013 | Miyazawa | ........... | G01D 13/265 362/23.14 |
| 2015/0266419 A1 * | 9/2015 | Pasotti | ................ | B60Q 3/044 362/23.11 |
| 2015/0291092 A1 * | 10/2015 | Nirei | ................ | G01D 11/28 362/511 |

FOREIGN PATENT DOCUMENTS

| | | |
|---|---|---|
| JP | 2003-302262 A | 10/2003 |
| JP | 2004325829 A | 11/2004 |
| JP | 2010-085356 A | 4/2010 |
| JP | 2014-081264 A | 5/2014 |
| KR | 10-2007-0120736 A | 12/2007 |

OTHER PUBLICATIONS

Notice of Allowance issued in corresponding Korean Patent Application No. 10-2015-0174953, dated Sep. 1, 2017.

* cited by examiner

VEHICLE INSTRUMENT PANEL HAVING THREE-DIMENSIONAL ILLUMINATION EFFECT

This application claims the benefit of priority to Korean Patent Application No. 10-2015-0174953, filed on Dec. 9, 2015 with the Korean Intellectual Property Office, which is hereby incorporated by reference as if fully set forth herein.

TECHNICAL FIELD

The present disclosure relates to a vehicle instrument panel and, more particularly, to a vehicle instrument panel having a three-dimensional illumination effect which enables a driver to accurately and conveniently recognize a scale or image for indicating, for example, the driving speed while driving.

BACKGROUND

Generally, a vehicle instrument panel comprises a speedometer for indicating a driving speed, a thermometer for indicating a temperature of cooling water, a fuel gauge for indicating the level of remaining fuel, and so on.

The vehicle instrument panel, including the speedometer, the thermometer, the fuel gauge and the like, shows the driver information related to driving and the state of various devices in order to assist the driver in driving safely.

In the case of a dual-scale gauge, such as a speedometer having both a metric scale in kilometers per hour (km/h) and an English scale in miles per hour (mph), visibility may be low, or sub-optimal, due to the two different scales, and it may be hard for the driver to instantly recognize the driving speed although the pointer indicates a certain numeric character on the scale.

Further, the scales of the speedometer are illuminated by a plurality of light sources, which are disposed corresponding to the respective scales, and thus a problem may occur whereby the number of light sources may increase according to the arrangement of the scales in order to improve illumination uniformity.

SUMMARY OF THE DISCLOSURE

Accordingly, the present disclosure is directed to a vehicle instrument panel having a three-dimensional illumination effect that substantially obviates one or more problems due to limitations and disadvantages of the related art.

An object of the present disclosure is to provide a vehicle instrument panel having a three-dimensional illumination effect, which provides a driver with correct and stereoscopic information relating, for example, to driving speed, using a three-dimensional scale, even when the driver drives in the daytime or into the sun.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve the objects and other advantages and in accordance with the purpose of the disclosure, as embodied and broadly described herein, a vehicle instrument panel having a three-dimensional illumination effect includes a transparent ring having a three-dimensional circular shape, at least one primary scale formed in a front surface of the transparent ring, the at least one primary scale being spaced apart from an adjacent primary scale by a predetermined distance, a reflecting plate for changing a direction of travel of LED light, generated below the transparent ring, to travel along the transparent ring in clockwise and counterclockwise directions, and a prism unit including at least one prism for reflecting a portion of the LED light traveling along the transparent ring toward the at least one primary scale at a predetermined angle.

The at least one prism may be disposed below the transparent ring, the at least one prism being spaced apart from an adjacent prism corresponding to the at least one primary scale.

The LED light may be generated from two first light sources.

The vehicle instrument panel may further include at least one secondary scale formed between the at least one primary scale.

The vehicle instrument panel may further include at least one second light source provided corresponding to the at least one secondary scale, and LED light generated from the at least one second light source may be directly radiated toward the secondary scale.

The at least one primary scale and the at least one secondary scale may be scales for indicating a driving speed.

The vehicle instrument panel may further include a light guide plate disposed below the secondary scale in order to guide the LED light generated from the at least one second light source to be directly radiated toward the secondary scale.

The vehicle instrument panel may further include a colored layer printed on a rear surface of the transparent ring, and a portion of the LED light reflected from the at least one prism may pass through the colored layer.

The primary scale and the secondary scale may be scales of any one of a speedometer for indicating a driving speed, a thermometer for indicating a temperature of cooling water, and a fuel gauge for indicating a level of remaining fuel.

The reflecting plate may be provided in the same number as the number of the first light sources.

According to another embodiment of the present disclosure, a vehicle instrument panel having a three-dimensional illumination effect includes a first transparent ring having a three-dimensional circular shape, a second transparent ring connected to a portion of the first transparent ring, at least one primary scale formed in a front surface of the first transparent ring, the at least one primary scale being spaced apart from an adjacent primary scale by a predetermined distance, a reflecting plate for changing a direction of travel of LED light, generated below the second transparent ring, to travel along the first transparent ring in clockwise and counterclockwise directions, and a prism unit including at least one prism for reflecting a portion of the LED light traveling along the first transparent ring toward the at least one primary scale at a predetermined angle.

The at least one prism may be disposed below the first transparent ring, the at least one prism being spaced apart from an adjacent prism corresponding to the at least one primary scale.

The LED light may be generated from two first light sources.

The vehicle instrument panel may further include at least one secondary scale formed between the at least one primary scale.

The vehicle instrument panel may further include at least one second light source provided corresponding to the at least one secondary scale, and LED light generated from the at least one second light source may be directly radiated toward the secondary scale.

The at least one primary scale and the at least one secondary scale may be scales for indicating a driving speed.

The vehicle instrument panel may further include a light guide plate disposed below the secondary scale in order to guide the LED light generated from the at least one second light source to be directly radiated toward the secondary scale.

The vehicle instrument panel may further include a colored layer printed on rear surfaces of the first transparent ring and the second transparent ring, and a portion of the LED light reflected from the at least one prism may pass through the colored layer.

The primary scale and the secondary scale may be scales of any one of a speedometer for indicating a driving speed, a thermometer for indicating a temperature of cooling water, and a fuel gauge for indicating a level of remaining fuel.

The reflecting plate may be provided in the same number as the number of the first light sources.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The patent or application file contains least one drawing executed in color. Copies of this patent or patent application publication with color drawing(s) will be provided by the Office upon request and payment of the necessary fee. The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings.

Suffixes "module" and "unit" used in a configuration component described hereinafter are assigned or used together in consideration of only the convenience in creating this specification, and the two suffixes themselves do not have any distinguished meanings or roles from each other.

It will be understood that the term "and/or" as used herein refers to and encompasses any and all possible combinations of one or more of the associated listed items.

In addition, since terms, such as "comprising," "including," and "having" mean that one or more corresponding components may exist unless they are specifically described to the contrary, it shall be construed that one or more other components can be included.

A vehicle instrument panel having a three-dimensional illumination effect described hereinafter may refer to a three-dimensional instrument panel having a planar front surface, a curved side surface bent from the inner circumference of the planar front surface, a primary scale formed both in the planar front surface and in the curved side surface, and a secondary scale formed only in the planar front surface.

The primary scale and the secondary scale may be scales of any one of a speedometer for indicating a driving speed, a thermometer for indicating a temperature of cooling water and a fuel gauge for indicating a level of remaining fuel.

Hereinafter, a case where the vehicle instrument panel having a three-dimensional illumination effect is a speedometer having the aforementioned primary scale and secondary scale will be described in detail as an example.

However, this is merely exemplary, and the disclosure can also be applied to a thermometer and a fuel gauge.

Figure 1:
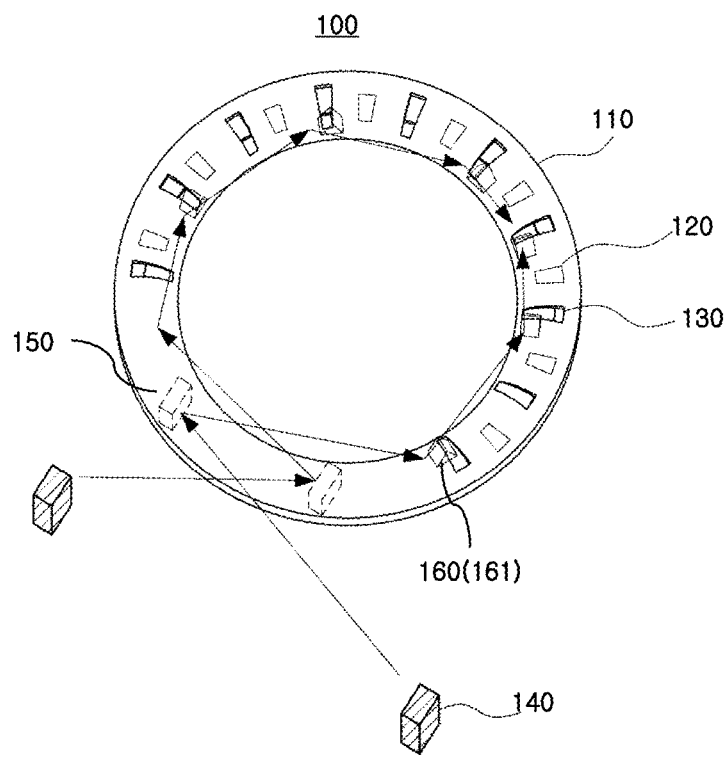
FIG. 1 is a view illustrating a vehicle instrument panel having a three-dimensional illumination effect according to one embodiment of the present disclosure.

FIG. 1 is a view illustrating the vehicle instrument panel having a three-dimensional illumination effect according to one embodiment of the present disclosure.

Referring to FIG. 1, the vehicle instrument panel 100 according to one embodiment of the present disclosure may include a transparent ring 110, a primary scale 130, a secondary scale 120, a first light source 140, a reflecting plate 150 and a prism unit 160.

The transparent ring 110 is formed to have a three-dimensional circular shape. The three-dimensional circular shape may be a shape that has a flat surface (a planar front surface) and a curved side surface bent from the inner circumference of the flat surface.

The transparent ring 110 may be made through injection molding using a glass material such as transparent crystal, an acrylic resin such as PMMA, or the like so that three-dimensional scales or characters can be seen from the outside.

The three-dimensional scales or characters may be formed in the transparent ring 110 using an Nd-YAG laser method. Since this is well known in the art, an explanation thereof will be omitted.

The secondary scale 120 may be formed in the flat surface of the transparent ring 110, and the primary scale 130 may be formed both in the flat surface and in the curved side surface of the transparent ring 110.

The primary scale 130 may be provided in plural numbers (at least one), which are spaced a predetermined distance apart from each other in the planar front surface and the curved side surface of the transparent ring 110 in the circumferential direction.

In such a case, the secondary scale 120 may be provided in plural numbers, each of which is located between adjacent primary scales 130. Unlike the primary scales 130, the secondary scales 120 may be formed only in the planar front surface of the transparent ring 110.

Accordingly, the primary scale 130 may be a three-dimensional scale, and the secondary scale 120 may be a two-dimensional scale, like a conventional scale.

The first light source 140 may be embodied as an LED that emits LED light. At least one first light source 140 may be disposed at a region below the transparent ring 110, for example, on a PCB (Printed Circuit Board). Two first light sources 140, each being embodied as an LED, may be provided.

Two first light sources 140 may be provided to sufficiently improve the visibility of the scales even though the number of LEDs is decreased below the number of LEDs in a conventional instrument panel.

The reflecting plate 150 may be provided in the same number as the number of first light source 140, and may be disposed at a region below the transparent ring 110, for example, between the transparent ring 110 and the first light source 140. The reflecting plate 150 functions to change the direction in which the LED light emitted from the first light source 140 travels.

In a case in which two first light sources 140 are provided, the left reflecting plate 150 may reflect the LED light generated from the right first light source 140 to the right so as to change the direction of travel of the LED light generated from the right first light source 140 in the counterclockwise direction. As a result, the LED light reflected from the left reflecting plate 150 may travel along the transparent ring 110 in the counterclockwise direction.

Meanwhile, the right reflecting plate 150 may reflect the LED light generated from the left first light source 140 to the left so as to change the direction of travel of the LED light generated from the left first light source 140 in the clockwise direction. As a result, the LED light reflected from the right reflecting plate 150 may travel along the transparent ring 110 in the clockwise direction.

The prism unit 160 may be disposed a predetermined distance below the transparent ring 110. The prism unit 160 may include at least one prism 161, which is arranged corresponding to a predetermined primary scale 130.

For example, one prism 161 may be disposed on the PCB corresponding to a predetermined primary scale 130, and other prisms 161 may also be disposed on the PCB, respectively corresponding to the third, fifth and seventh primary scales 130, which are sequentially spaced apart from the predetermined primary scale 130.

However, this arrangement of the prisms 161 is merely illustrative, and the prisms 161 may be arranged apart from each other in a manner different from the above-described arrangement.

Each of the prisms 161 may be configured to reflect a portion of the LED light, which is reflected from the reflecting plate 150 and travels along the transparent ring 110 in the predetermined direction (i.e. one ray of LED light in the clockwise direction and the other ray of LED light in the counterclockwise direction), toward at least one primary scale 130 at a predetermined angle.

The predetermined angle at which a portion of the LED light is reflected from the prism may be in the range from about 90 degrees to about 160 degrees.

The circular-shaped transparent ring 110 may have a colored layer (not shown) that is printed on the rear surface thereof.

If at least one ray of LED light reflected from the prisms 161 passes through the colored layer, it may be possible to obtain LED light having a color according to the color of the colored layer.

Further, a colored layer having two or more colors may be printed on the rear surface of the circular-shaped transparent ring 110. For example, a colored layer having blue and red colors may be printed on the rear surface of the transparent ring 110.

As described above, the visibility of the instrument panel according to this embodiment can be improved by virtue of the reflecting plate and the prism unit while the number of light sources is minimized.

Figure 2:
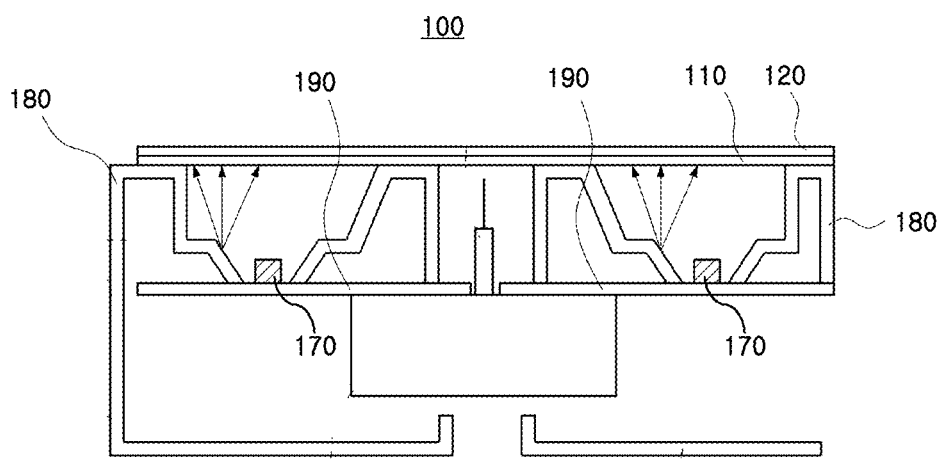
FIG. 2 is a view illustrating the constitution of a second light source and a light guide plate, which are added to the vehicle instrument panel depicted in FIG. 1.

FIG. 2 is a sectional view illustrating the constitution of a second light source and a light guide plate, which may be added to the vehicle instrument panel depicted in FIG. 1.

Referring to FIG. 2, the vehicle instrument panel 100 according to one embodiment of the present disclosure may further include a second light source 170 and a light guide plate 180.

Like the first light source 140, the second light source 170 may be embodied as an LED that emits LED light. At least one second light source 170 may be disposed at a region below the transparent ring 110, for example, on a PCB 190.

The number of second light sources 170 may be greater than the number of first light sources 140. The number of second light sources 170 may be the same as the number of secondary scales 120. When the secondary scales 120 are divided into several groups, the number of second light sources 170 may be the same as the number of groups.

The LED light emitted from at least one second light source 170 may be directly radiated toward the secondary scales 120 formed in the transparent ring 110 through the light guide plate 180.

The light guide plate 180 functions to guide the LED light emitted from at least one second light source 170 so that the LED light can directly reach the secondary scales 120. The light guide plate 180 may be configured as partitions that are disposed on the PCB 190, with the second light source 170 located in the middle between the partitions.

Figure 3:
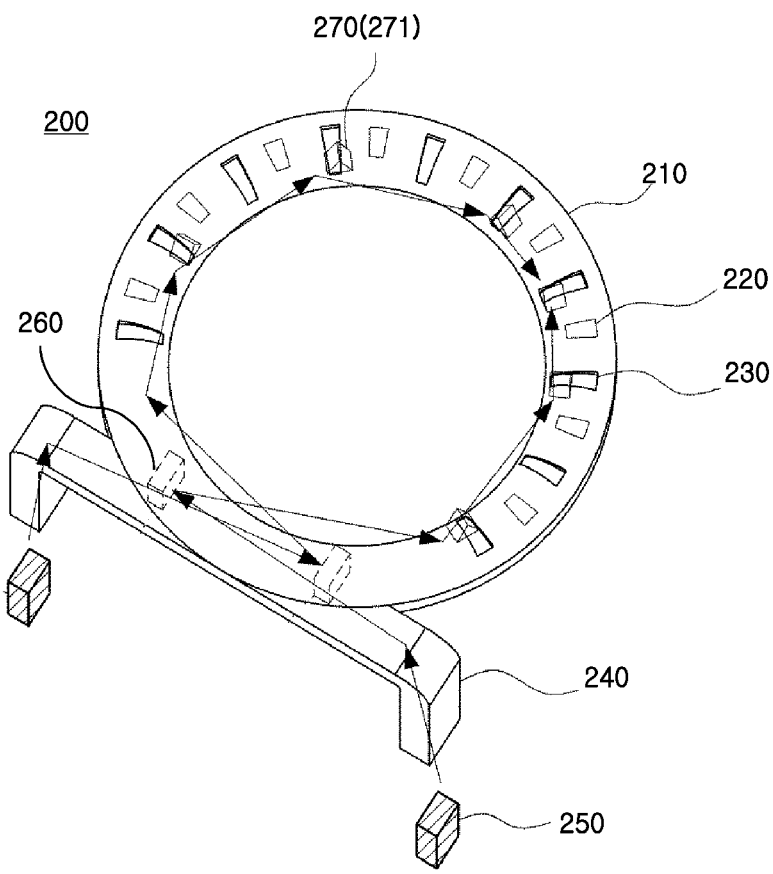
FIG. 3 is a view illustrating a vehicle instrument panel having a three-dimensional illumination effect according to another embodiment of the present disclosure.

FIG. 3 is a view illustrating a vehicle instrument panel having a three-dimensional illumination effect according to another embodiment of the present disclosure.

Referring to FIG. 3, the vehicle instrument panel 200 according to another embodiment of the present disclosure may include a first transparent ring 210, a primary scale 230, a secondary scale 220, a second transparent ring 240, a first light source 250, a reflecting plate 260 and a prism unit 270.

The first transparent ring 210 may be formed to have a three-dimensional circular shape. The three-dimensional circular shape may be a shape that has a flat surface (a planar front surface) and a curved side surface bent from the inner circumference of the flat surface.

The first transparent ring 210 may be made through injection molding using a glass material such as transparent crystal, an acrylic resin such as PMMA, or the like so that three-dimensional scales or characters can be seen from the outside.

The three-dimensional scales or characters may be formed in the first transparent ring 210 using an Nd-YAG laser method. Since this is well known in the art, an explanation thereof will be omitted.

The secondary scale 220 may be formed in the flat surface of the first transparent ring 210, and the primary scale 230 may be formed both in the flat surface and in the curved side surface of the first transparent ring 210.

The primary scale 230 may be provided in plural numbers (at least one), which are spaced a predetermined distance apart from each other in the planar front surface and the curved side surface of the first transparent ring 210 in the circumferential direction.

In this case, the secondary scale 220 may be provided in plural numbers, each of which is located between adjacent primary scales 230. Unlike the primary scales 230, the secondary scales 220 may be formed only in the planar front surface of the first transparent ring 210.

Accordingly, the primary scale 230 may be a three-dimensional scale, and the secondary scale 220 may be a two-dimensional scale, like a conventional scale.

The second transparent ring 240 may be connected to a portion of the first transparent ring 210.

Like the first transparent ring 210, the second transparent ring 240 may be made through injection molding using a glass material such as transparent crystal, an acrylic resin such as PMMA, or the like so that three-dimensional scales or characters can be seen from the outside.

The three-dimensional scales or characters may be formed in the second transparent ring 240 using an Nd-YAG laser method. Since this is well known in the art, an explanation thereof will be omitted.

The first light source 250 may be embodied as an LED that emits LED light. At least one first light source 250 may be disposed at a region below the first transparent ring 210 and/or the second transparent ring 240, for example, on a PCB. Two first light sources 250, each being embodied as an LED, may be provided.

Two first light sources 250 may be provided to sufficiently improve the visibility of the scales even though the number of LEDs is decreased below the number of LEDs in a conventional instrument panel.

The reflecting plate 260 may be provided in the same number as the number of first light source 250, and may be disposed at a region below the second transparent ring 240, for example, between the second transparent ring 240 and the first light source 250. The reflecting plate 260 functions to change the direction in which the LED light emitted from the first light source 250 travels.

In the case in which two first light sources 250 are provided, the left reflecting plate 260 may reflect the LED light, which is generated from the right first light source 250 and travels to the left along the second transparent ring 240, to the right.

As a result, the LED light reflected from the left reflecting plate 260 may travel along the first transparent ring 210 in the counterclockwise direction.

The right reflecting plate 260 may reflect the LED light, which is generated from the left first light source 250 and travels along the second transparent ring 240, to the left so as to change the direction of travel of the LED light in the clockwise direction.

As a result, the LED light reflected from the right reflecting plate 260 may travel along the first transparent ring 210 in the clockwise direction.

The prism unit 270 may be disposed a predetermined distance below the first transparent ring 210 and/or the second transparent ring 240. The prism unit 270 may include a plurality of prisms 271, which are arranged on the PCB corresponding to predetermined primary scales 230.

For example, one prism 271 may be disposed on the PCB corresponding to a predetermined primary scale 230, and other prisms 271 may also be disposed on the PCB, respectively corresponding to the third, fifth and seventh primary scales 230 which are sequentially spaced apart from the predetermined primary scale 230.

However, this arrangement of the prisms 271 is merely illustrative, and the prisms 271 may be arranged apart from each other in a manner different from the above-described arrangement.

Each of the prisms 271 may be configured to reflect a portion of the LED light, which is reflected from the reflecting plate 260 and travels along the first transparent ring 210 in the predetermined direction (i.e. one ray of LED light in the clockwise direction and the other ray of LED light in the counterclockwise direction), toward at least one primary scale 230 at a predetermined angle.

The predetermined angle at which a portion of the LED light is reflected from the prism may be in the range from about 90 degrees to about 160 degrees.

A colored layer (not shown) may be printed on the rear surface of the circular-shaped first transparent ring 210 or on the rear surfaces of both the first transparent ring 210 and the second transparent ring 240.

If at least one ray of LED light reflected from the prisms 271 passes through the colored layer, it may be possible to obtain LED light having a color according to the color of the colored layer.

Further, a colored layer having two colors may be printed on the rear surface of the first transparent ring 210 or on the rear surfaces of both the first transparent ring 210 and the second transparent ring 240. For example, a colored layer having blue and red colors may be printed on the rear surface of the first transparent ring 210.

As described above, the visibility of the instrument panel according to this embodiment can be improved by virtue of the reflecting plate and the prism unit while the number of light sources is minimized.

As described above with reference to FIG. 2, the instrument panel according to this embodiment may also include a light guide plate and a second light source to emit LED light toward the secondary scales. Although an explanation of the components shown in FIG. 2 is omitted, it is to be understood that the components in FIG. 2 can also be applied to this embodiment.

Figure 4:
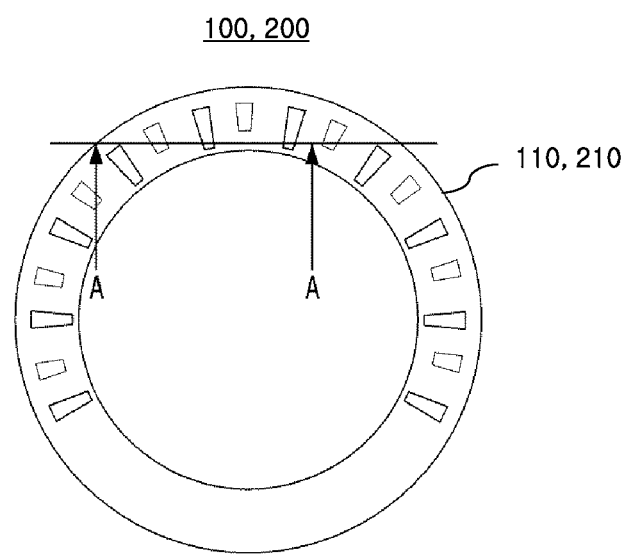
FIGS. 4 and 5 are views for explaining the angle of reflection of a prism unit according to the embodiments of the present disclosure.
Figure 5:
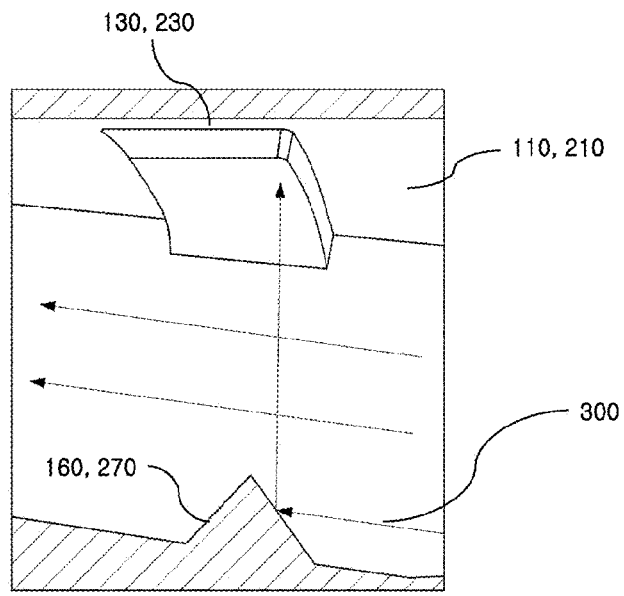

FIGS. 4 and 5 are views for explaining the angle of reflection of the prism unit according to the embodiments of the present disclosure.

FIG. 5 is a sectional view taken along line A-A in the vehicle instrument panel 100 or 200 depicted in FIG. 4.

As shown in the A-A sectional view of FIG. 5, the prism unit 160 or 270 disposed on the PCB has a predetermined angle of reflection ranging from about 90 degrees to about 160 degrees. The transparent ring 110 or the first transparent ring 210 is disposed above the prism unit 160 or 270.

In this case, the LED light 300 reflected from the prism 161 or 271 may be radiated toward the primary scale 130 formed in the front surface of the transparent ring 110 or toward the primary scale 230 formed in the front surface of the first transparent ring 210 at an angle ranging from about 90 degrees to about 160 degrees.

While the LED light moves (travels) along the transparent ring 110 or the first transparent ring 210 in opposite directions (clockwise and counterclockwise directions), as described above with reference to FIGS. 1 through 3, only a portion of the LED light 300 may be reflected according to the angle of reflection of the prism 161 or 271.

As described above, the visibility of the instrument panel can be improved by virtue of the angle of reflection of the prism unit while the number of light sources is minimized.

Figure 6:
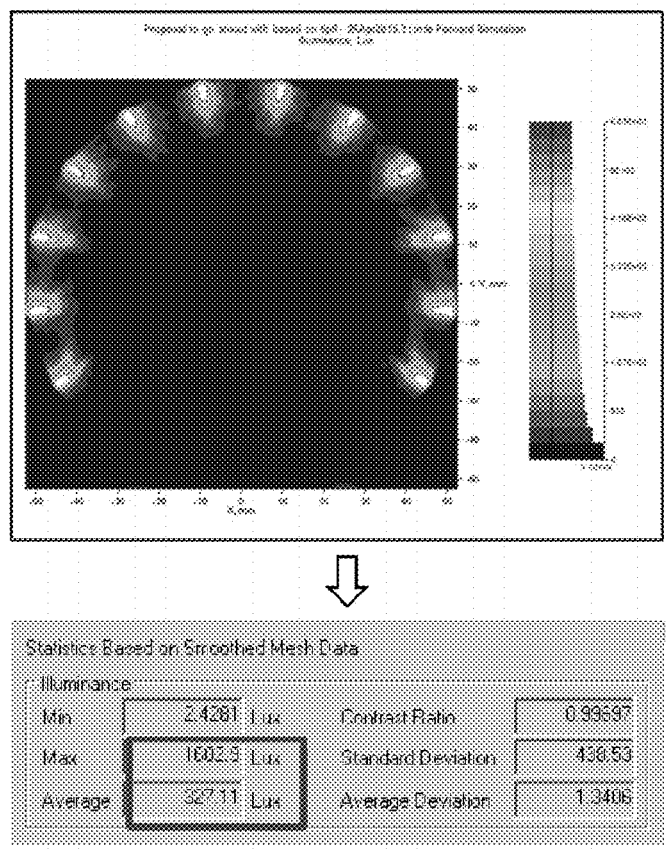
FIGS. 6 and 7 are simulation diagrams showing a result of measuring the illuminance of LED light radiated toward a primary scale of the vehicle instrument panel according to the embodiments of the present disclosure.
Figure 7:
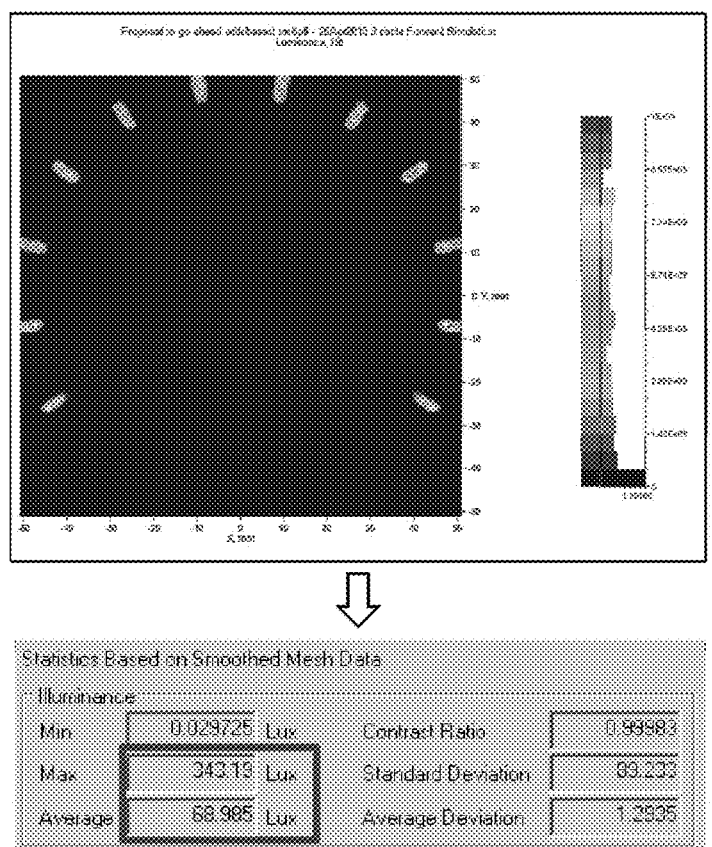

FIGS. 6 and 7 are simulation diagrams showing a result of measuring the illuminance of LED light radiated toward the primary scale of the vehicle instrument panel according to the embodiments of the present disclosure.

The measurement result in FIG. 6 shows that the illuminance of the LED light radiated toward the primary scale has a maximum value of about 1600 lux and an average value of about 327 lux in the daytime.

The measurement result in FIG. 7 shows that the illuminance of the LED light radiated toward the primary scale has a maximum value of about 343 lux and an average value of about 68 lux at night.

It can be known from the above result that the visibility of the instrument panel according to the present disclosure can be improved and a three-dimensional illumination effect can be achieved while the number of light sources is decreased below the number of light sources in a conventional instrument panel.

As is apparent from the above description, the present disclosure provides a vehicle instrument panel having a three-dimensional illumination effect, which is equipped with a reflecting plate and a prism unit, thereby improving the visibility and minimizing the number of light sources.

Further, besides two-dimensional scales, three-dimensional scales can be additionally formed in the instrument panel, which improves the degree of freedom in design and marketability and assists a driver in driving safely by reducing the time taken by the driver to recognize the driving speed through the scale of the speedometer.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A vehicle instrument panel having a three-dimensional illumination effect, the vehicle instrument panel comprising:
    a transparent ring having a three-dimensional circular shape;
    at least one primary scale formed in a front surface of the transparent ring, the at least one primary scale being spaced apart from an adjacent primary scale by a predetermined distance;
    a reflecting plate for changing a direction of travel of LED light along the transparent ring, generated below the transparent ring, in clockwise and counterclockwise directions;
    a prism unit including at least one prism for reflecting a portion of the LED light traveling along the transparent ring toward the at least one primary scale at a predetermined angle;
    at least one secondary scale formed between the at least one primary scale; and
    at least one second light source provided corresponding to the at least one secondary scale,
    wherein the transparent ring includes a plane and a curved surface, and light generated from the LED light moves through an area between the plane and the curved surface,
    wherein each of the at least one prism is arranged corresponding to a predetermined one of the at least one primary scale, and
    wherein LED light generated from the at least one second light source is directly radiated toward the secondary scale.

2. The vehicle instrument panel according to claim 1, wherein the at least one prism is disposed below the transparent ring, the at least one prism being spaced apart from an adjacent prism corresponding to the at least one primary scale.

3. The vehicle instrument panel according to claim 1, wherein the LED light is generated from two first light sources.

4. The vehicle instrument panel according to claim 1, wherein the at least one primary scale and the at least one secondary scale are scales for indicating a driving speed.

5. The vehicle instrument panel according to claim 1, further comprising a light guide plate disposed below the secondary scale in order to guide the LED light generated from the at least one second light source to be directly radiated toward the secondary scale.

6. The vehicle instrument panel according to claim 1, further comprising:
    a colored layer printed on a rear surface of the transparent ring,
    wherein a portion of the LED light reflected from the at least one prism passes through the colored layer.

7. The vehicle instrument panel according to claim 1, wherein the primary scale and the secondary scale are scales corresponding to any one of a speedometer for indicating a driving speed, a thermometer for indicating a temperature of cooling water and a fuel gauge for indicating a level of remaining fuel.

8. The vehicle instrument panel according to claim 3, wherein the reflecting plate is provided in the same number as the number of the first light sources.

9. A vehicle instrument panel having a three-dimensional illumination effect, the vehicle instrument panel comprising:
    a first transparent ring having a three-dimensional circular shape;
    a second transparent ring connected to a portion of the first transparent ring;
    at least one primary scale formed in a front surface of the first transparent ring, the at least one primary scale being spaced apart from an adjacent primary scale by a predetermined distance;
    a reflecting plate for changing a direction of travel of LED light along the first transparent ring, generated below the second transparent ring, in clockwise and counterclockwise directions;
    a prism unit including at least one prism for reflecting a portion of the LED light traveling along the first transparent ring toward the at least one primary scale at a predetermined angle;
    at least one secondary scale formed between the at least one primary scale; and
    at least one second light source provided corresponding to the at least one secondary scale,
    wherein the transparent ring includes a plane and a curved surface, and light generated from the LED light moves through an area between the plane and the curved surface,
    wherein each of the at least one prism is arranged corresponding to a predetermined one of the at least one primary scale, and
    wherein LED light generated from the at least one second light source is directly radiated toward the secondary scale.

10. The vehicle instrument panel according to claim 9, wherein the at least one prism is disposed below the first transparent ring, the at least one prism being spaced apart from an adjacent prism corresponding to the at least one primary scale.

11. The vehicle instrument panel according to claim 9, wherein the LED light is generated from two first light sources.

12. The vehicle instrument panel according to claim 9, wherein the at least one primary scale and the at least one secondary scale are scales for indicating a driving speed.

13. The vehicle instrument panel according to claim 9, further comprising a light guide plate disposed below the secondary scale in order to guide the LED light generated from the at least one second light source to be directly radiated toward the secondary scale.

14. The vehicle instrument panel according to claim 9, further comprising:
- a colored layer printed on rear surfaces of the first transparent ring and the second transparent ring,
- wherein a portion of the LED light reflected from the at least one prism passes through the colored layer.

15. The vehicle instrument panel according to claim 9, wherein the primary scale and the secondary scale are scales corresponding to any one of a speedometer for indicating a driving speed, a thermometer for indicating a temperature of cooling water and a fuel gauge for indicating a level of remaining fuel.

16. The vehicle instrument panel according to claim 11, wherein the reflecting plate is provided in the same number as the number of the first light sources.

\* \* \* \* \*